United States Patent
Morioka

(10) Patent No.: US 8,663,867 B2
(45) Date of Patent: Mar. 4, 2014

(54) METHOD OF MANUFACTURING A MEMBRANE ELECTRODE ASSEMBLY, MEMBRANE ELECTRODE ASSEMBLY AND FUEL CELL

(75) Inventor: Hiroyuki Morioka, Tokyo (JP)

(73) Assignee: Toppan Printing Co., Ltd. (JP)

( * ) Notice: Subject to any disclaimer, the term of this patent is extended or adjusted under 35 U.S.C. 154(b) by 562 days.

(21) Appl. No.: 12/620,429

(22) Filed: Nov. 17, 2009

(65) Prior Publication Data

US 2010/0124686 A1 May 20, 2010

(30) Foreign Application Priority Data

Nov. 19, 2008 (JP) .................................. 2008-295369

(51) Int. Cl.
*H01M 8/10* (2006.01)

(52) U.S. Cl.
USPC ........... 429/483; 429/480; 429/481; 429/482; 427/115

(58) Field of Classification Search
USPC .................................. 429/400–535; 427/115
See application file for complete search history.

(56) References Cited

U.S. PATENT DOCUMENTS

| | | | |
|---|---|---|---|
| 6,723,464 B2 * | 4/2004 | Tabata et al. | 429/480 |
| 2003/0118890 A1 * | 6/2003 | Wittpahl et al. | 429/44 |

FOREIGN PATENT DOCUMENTS

| | | |
|---|---|---|
| JP | 2006-120506 | 5/2006 |
| JP | 2006-252948 | 9/2006 |
| JP | 2006-332041 | 12/2006 |
| JP | 2007-080726 | 3/2007 |
| JP | 2007-087651 | 4/2007 |
| JP | 2007-141588 | 6/2007 |

OTHER PUBLICATIONS

Park et al. "Performace enhancement of PEMFC through temperature control in catalyst layer fabrication". Electrochimica Acta 53 (2007) 763-767. Jul. 2007. Retrieved from internet on Jul. 2, 2012: http://www.snupeel.com/wp/wp-content/themes/peel/paper/117.pdf.*
Japanese Notification of Reasons for Refusal dispatched by JPO on Apr. 9, 2013, in connection with Appl. No. 2008-295369, 3 pgs.
Translation of the Japanese Notification of Reasons for Refusal dispatched by JPO on Apr. 9, 2013, in connection with Appl. No. 2008-295369, 6 pgs.

* cited by examiner

*Primary Examiner* — Christopher Schatz
(74) *Attorney, Agent, or Firm* — Squire Sanders (US) LLP

(57) ABSTRACT

The present invention provides an MEA which improves water retention properties of an electrode catalyst layer without inhibiting diffusion of a reaction gas and drainage of water produced by an electrode reaction etc. One aspect of the present invention is a manufacturing method of an MEA which includes coating and drying a catalyst ink to form a first electrode catalyst sub-layer, coating and drying a catalyst ink to form a second electrode catalyst sub-layer, and forming the first and the second electrode catalyst sub-layers on a polymer electrolyte membrane in this order, and has a specific feature that a solvent removal rate in drying to form the first electrode catalyst sub-layer is higher than that in drying to form the second electrode catalyst sub-layer.

8 Claims, 4 Drawing Sheets

METHOD OF MANUFACTURING A MEMBRANE ELECTRODE ASSEMBLY, MEMBRANE ELECTRODE ASSEMBLY AND FUEL CELL

CROSS REFERENCE TO RELATED APPLICATION

This application is based on and claims the benefit of priority from the Japanese Patent Application number 2008-295369, filed on Nov. 19, 2008, the entire contents of which are incorporated herein by reference.

BACKGROUND OF THE INVENTION

1. Field of the Invention

The present invention relates to a membrane electrode assembly (MEA) and its manufacturing method, and further, a fuel cell which includes the MEA. More specifically, the present invention relates to an MEA which has a high level of power generation performance under a condition of low humidification, and its manufacturing method and a proton exchange membrane fuel cell (PEMFC) using the same.

2. Description of the Related Art

Fuel cells are power generation systems which produce electric power along with heat. A fuel gas including hydrogen and an oxidant gas including oxygen reacts together at electrodes containing a catalyst so that the reverse reaction of water electrolysis takes place in a fuel cell. Fuel cells are attracting attention as a clean energy source of the future since they have advantages such as a small impact on the environment and a low level of noise production relative to conventional power generation systems. Fuel cells are divided into several types according to the employed ion conductor. A fuel cell which uses a proton-conductive polymer membrane is called a proton exchange membrane fuel cell (PEMFC).

Among various fuel cells, a PEMFC, which can be used at around room temperature, is considered as a promising fuel cell for use in a vehicle and a household stationary power supply etc. and is being developed widely in recent years. A joint unit which has a pair of electrode catalyst layers on both sides of a polymer electrolyte membrane and which is called a membrane electrode assembly (MEA) is arranged between a pair of separators, on which either a gas flow path for supplying a fuel gas including hydrogen to one of the electrodes or a gas flow path for supplying an oxidant gas including oxygen to the other electrode is formed, in the PEMFC. The electrode for supplying a fuel gas is called a fuel electrode or cathode (electrode), whereas the electrode for supplying an oxidant gas is called an air electrode or anode (electrode). Each of the electrodes includes an electrode catalyst layer, which has stacked polymer electrolytes with carbon particles on which a catalyst such as a noble metal of platinum group is loaded, and a gas diffusion layer which has gas permeability and electron conductivity.

In order to improve output density of the fuel cell a number of attempts have been made to increase gas diffusion properties with respect to the electrode catalyst layers. A plurality of materials passes through pores in the electrode catalyst layer which are associated with a separator via a gas diffusion layer. The electrode catalyst layer on the fuel electrode supplies not only the fuel gas to the three-phase interface, at which the electrode reaction occurs, but also supplies water, which serves to smoothly conduct a produced proton in the polymer electrolyte membrane. The electrode catalyst layer on the air electrode removes water produced by the electrode reaction as well as supplies the oxidant gas.

In order to prevent a so-called flooding phenomenon, in which the power generation reaction stops by a hindrance of material transport, a number of techniques to improve drainage properties have been developed with respect to the MEA (See, for example, patent document 1-4 below).

In addition, among various problems to be solved to commercialize a PEMFC such as improvement of output density and durability, the most essential problem is cost reduction.

Reducing a humidifier is one way to reduce cost. Perfluorosulfonate membranes and hydrocarbon membranes are widely used as the polymer electrolyte membrane located in the center of an MEA. Since it is supposed to be necessary to adjust the moisture condition of such a polymer electrolyte membrane to almost a saturated water vapor pressure atmosphere in order to obtain excellent proton conductivity, water vapor is supplied by a humidifier from the exterior in the present technology. Thus, for the purpose of low power consumption and simplification, polymer electrolyte membranes which require no humidifier and have sufficient proton conductivity even under a low humidification condition are under development.

However, since an electrode catalyst layer with improved drainage properties makes a polymer electrolyte membrane dry under a low humidification condition, it becomes necessary to optimize a structure of the electrode catalyst layer to improve water retention properties. For example, a method of interposing a humid control film between the electrode catalyst layer and the gas diffusion layer has been proposed to improve water retention properties of a fuel cell under a low humidification condition.

For example, patent document 5 cited below discloses a method in which a humid control film made of conductive carbon powder and polytetrafluoroethylene prevents the polymer electrolyte membrane from drying by the humid control function. In addition, patent document 6 discloses a method of forming chases on the electrode catalyst layer's surface which contacts the polymer electrolyte membrane so that a decrease in power generation performance under a low humidification condition is suppressed by forming chases of 0.1-0.3 mm in width.

<Patent document 1>JP-A-2006-120506
<Patent document 2>JP-A-2006-332041
<Patent document 3>JP-A-2007-087651
<Patent document 4>JP-A-2007-080726
<Patent document 5>JP-A-2006-252948
<Patent document 6>JP-A-2007-141588

There is a problem, however, in these MEAs described in the patent document 1-6 that they do not have a satisfactory power generation performance. In addition, manufacturing methods of these also have a problem of complexity and high-cost.

SUMMARY OF THE INVENTION

Hence, it is a purpose of the present invention to provide a method for manufacturing an MEA having not only drainage properties which enable the electrode catalyst layer to remove water produced by the electrode reaction but also adequate water retention properties so that the MEA has a high level of power generation performance even under a low humidification condition, whereby such an MEA is manufactured efficiently, economically and easily.

In order to solve the problems above, a first aspect of the present invention is a method of manufacturing an MEA having a polymer electrolyte membrane interposed between a pair of electrode catalyst layers, one of the electrode catalyst layers having mth electrode catalyst sub-layers (m: a number from 1 to n, n: an arbitrary integer larger than 1.), the method including coating a first catalyst ink on a substrate and drying the first catalyst ink to form a first electrode catalyst sub-layer of the mth electrode catalyst sub-layers, coating a second catalyst ink on a substrate and drying the catalyst ink to form a second electrode catalyst sub-layer of the mth electrode catalyst sub-layers, and stacking the mth electrode catalyst sub-layers on at least one surface of the polymer electrolyte membrane in the order of increasing m, the first catalyst ink being a dispersion solvent which contains catalyst loaded particles, a polymer electrolyte and a solvent, the second catalyst ink also being a dispersion solvent which contains catalyst loaded particles, a polymer electrolyte and a solvent, and a solvent removal rate when drying the first catalyst ink to form the first electrode catalyst sub-layer being higher than a solvent removal rate when drying the second catalyst ink to form the second electrode catalyst sub-layer.

In addition, a second aspect of the present invention is a method of manufacturing an MEA having a polymer electrolyte membrane interposed between a pair of electrode catalyst layers, at least one of the electrode catalyst layers having a first electrode catalyst sub-layer, a second electrode catalyst sub-layer, - - - , and an nth electrode catalyst sub-layer (n: an arbitrary integer number larger than 1) in the case of n=2, the nth electrode catalyst sub-layer and the second electrode catalyst sub-layer are identical, the method including coating a first catalyst ink on a substrate and drying the first catalyst ink to form the first electrode catalyst sub-layer, coating a second catalyst ink on the substrate and drying the second catalyst ink to form the second electrode catalyst sub-layer, and forming the first electrode catalyst sub-layer, the second electrode catalyst sub-layer, - - - , and the nth electrode catalyst sub-layer on at least one surface of the polymer electrolyte membrane in such a way that the first electrode catalyst sub-layer is arranged closest to the polymer electrolyte membrane, the second electrode catalyst sub-layer is arranged second closest to the polymer electrolyte membrane, - - - , and the nth electrode catalyst sub-layer is arranged farthest from the polymer electrolyte membrane, the first catalyst ink being a dispersion solvent which contains catalyst loaded particles, a polymer electrolyte and a solvent, the second catalyst ink also being a dispersion solvent which contains catalyst loaded particles, a polymer electrolyte and a solvent, and a solvent removal rate when drying the first catalyst ink to form the first electrode catalyst sub-layer being higher than a solvent removal rate when drying the second catalyst ink to form the second electrode catalyst sub-layer.

In addition, a third aspect of the present invention is the method according to the second aspect of the present invention, wherein the first electrode catalyst sub-layer has a larger reduced volume of fine pores of 1.0 μm or less in diameter, which is obtained by mercury porosimetry and a conversion by cylinder approximation, than any of the second electrode catalyst sub-layer to the nth electrode catalyst sub-layer.

In addition, a fourth aspect of the present invention is the method according to the third aspect of the present invention, wherein the reduced volume of fine pores of 1.0 μm or less in diameter, which is obtained by mercury porosimetry and a conversion by cylinder approximation, of the first electrode catalyst sub-layer is larger than that of the nth electrode catalyst sub-layer by a difference in the range of 0.1-1.0 mL/g-(electrode catalyst sub-layer).

In addition, a fifth aspect of the present invention is the method according to the second aspect of the present invention, wherein a drying temperature for drying the first catalyst ink to form the first electrode catalyst sub-layer is higher than a drying temperature for drying the second catalyst ink to form the second electrode catalyst sub-layer.

In addition, a sixth aspect of the present invention is the method according to the fifth aspect of the present invention, wherein the drying temperature for drying the first catalyst ink to form the first electrode catalyst sub-layer is higher than the drying temperature for drying the second catalyst ink to form the second electrode catalyst sub-layer by a difference of 40° C. or more.

In addition, a seventh aspect of the present invention is the method according to the sixth aspect of the present invention, wherein the first electrode catalyst sub-layer has a larger reduced volume of fine pores of 1.0 μm or less in diameter, which is obtained by mercury porosimetry and a conversion by cylinder approximation, than any of the second electrode catalyst sub-layer to the nth electrode catalyst sub-layer.

In addition, an eighth aspect of the present invention is the method according to the seventh aspect of the present invention, wherein the reduced volume of fine pores of 1.0 μm or less in diameter, which is obtained by mercury porosimetry and a conversion by cylinder approximation, of the first electrode catalyst sub-layer is larger than that of the nth electrode catalyst sub-layer by a difference in the range of 0.1-1.0 mL/g-(electrode catalyst sub-layer).

In addition, a ninth aspect of the present invention is an MEA having a polymer electrolyte membrane interposed between a pair of electrode catalyst layers, wherein reduced volumes of fine pores of 1.0 μm or less in diameter, which are obtained by mercury porosimetry and a conversion by cylinder approximation, in at least one of said electrode catalyst layers increase from the outer surface side of at least one of said electrode catalyst layers toward an inner boundary side with the polymer electrolyte membrane.

In addition, a tenth aspect of the present invention is the MEA according to the ninth aspect of the present invention, wherein the difference between the highest and the lowest of the reduced volumes of fine pores of 1.0 μm or less in diameter, which are obtained by mercury porosimetry and a conversion by cylinder approximation, in said electrode catalyst layer is in the range of 0.1-1.0 mL/g-(electrode catalyst sub-layer).

In addition, an eleventh aspect of the present invention is a fuel cell having the MEA according to the eighth and tenth aspects of the present invention.

The present invention has succeeded in developing a manufacturing method which makes it possible to efficiently, economically and easily manufacture an MEA having an electrode catalyst layer in which a reduced volume of fine pores with a diameter equal to or less than 1.0 μm (measured by a mercury porosimetry and converted by a cylinder approximation) increases from the outer part of the MEA (a surface side of the electrode catalyst layer) to the center of the MEA (the polymer electrolyte membrane side of the electrode catalyst layer) to improve water retention properties without losing a drainage capability of water produced by the electrode reaction, whereby the MEA has a high level of power generation performance even under a low humidification condition.

DESCRIPTION OF REFERENCE NUMERALS AND SIGNS

1: Polymer electrolyte membrane,
2: Electrode catalyst layer,
3: Electrode catalyst layer,
12: Membrane electrode assembly (MEA),
4: Gas diffusion layer,
5: Gas diffusion layer,
6: Air electrode (Cathode),
7: Fuel electrode (Anode),
8: Gas flow path,
9: Cooling water path,
10: Separator,
2'': Catalyst ink,
3'': Catalyst ink,
2': Coated catalyst ink,
3': Coated catalyst ink,
2a: First electrode catalyst layer,
2b: Second electrode catalyst layer,
3a: First electrode catalyst layer,
3b: Second electrode catalyst layer,
22: Substrate,
X: Oven X, Y: Oven Y

DETAILED DESCRIPTION OF THE INVENTION

An MEA, along with its manufacturing method, and a fuel cell of the present invention is described below. The present invention, however, is not limited to the embodiments below. Each of the embodiments can be modified or redesigned with knowledge known in the art and such modified embodiments are also covered by the present invention.

First, an MEA of the present invention is described.

Figure 1:
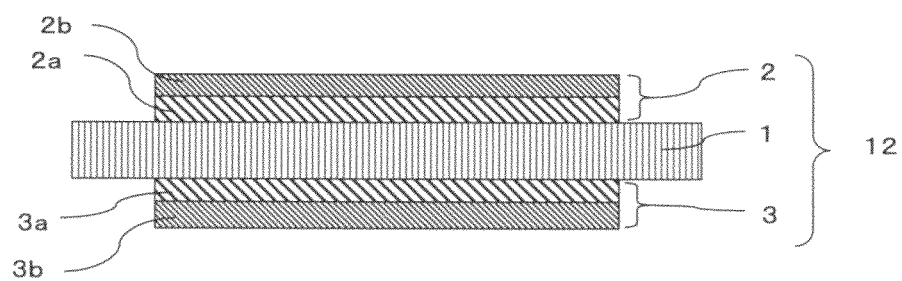
FIG. 1 is a cross section exemplary diagram of an MEA of the present invention.

FIG. 1 shows an exemplary cross section diagram of an MEA of the present invention. The MEA 12 of the present invention has electrode catalyst layers 2 and 3 on both sides of a polymer electrolyte membrane 1. At least one of the electrode catalyst layers of the MEA of the present invention includes a polymer electrolyte membrane and catalyst loaded carbons. It is a feature of the MEA of the present invention that a reduced volume of fine pores with a diameter equal to or less than 1.0 μm in diameter (The reduced volume is measured by a mercury porosimetry and converted by a cylinder approximation.) increases from a surface side to the center side (the polymer electrolyte membrane side) in at least one of the electrode catalyst layers.

An electrode catalyst layer of the MEA of the present invention has a multilayer structure of two or more sub-layers having a difference in reduced volume of fine pores with a diameter equal to or less than 1.0 μm (The reduced volume is measured by a mercury porosimetry and converted by a cylinder approximation). In FIG. 1, first electrode catalyst sub-layers 2a and 3a are arranged nearer to the polymer electrolyte membrane than second electrode catalyst sub-layers 2b and 3b.

In the case of FIG. 1, the first electrode catalyst sub-layers 2a and 3a, which are arranged on an inner polymer electrolyte membrane side, have a larger reduced volume of fine pores than the second electrode catalyst sub-layers 2b and 3b. The second electrode catalyst sub-layers 2b and 3b, which are arranged on an outer surface side, has a smaller reduced volume of fine pores than the first electrode catalyst sub-layers 2a and 3a.

An electrode catalyst layer of the MEA of the present invention has such an improved distribution of fine pores in the layer thickness direction that the reduced volume of fine pores gradually increases from the outer side (surface side of the electrode catalyst layer) to the inner side (boundary side with the polymer electrolyte membrane) so that water retention properties of the electrode catalyst layer are improved without loosing diffusion properties of the reaction gases and disturbing removal of water produced by the electrode reaction. Thus, because of sufficient water retained even under a low humidified condition as well as prevention of a flooding phenomenon, the MEA of the present invention has a high level of power generation performance.

An electrode catalyst layer of the MEA of the present invention keeps both the drainage of water produced by the electrode reaction and the water retention properties under a low humidification condition by taking such a hybrid structure of a porous (pore rich) structure near the boundary with the polymer electrolyte membrane and a denser (lower pore volume) structure near the surface of the electrode catalyst layer.

Unlike MEAs which receive a conventional treatment to cope with a low humidification condition such as the application of a humid control film or formation of chases on the catalyst electrode layer surface etc., it is not observed in the MEA of the present invention that a decrease in power generation performance due to an increase of interface resistance occurs. Therefore, a fuel cell having an MEA of the present invention has a remarkable effect of higher level of power generation performance even under a low humidified condition than conventional fuel cells.

In addition, it is preferable in (among MEAs of the present invention) an MEA with an electrode catalyst layer having a multilayer structure in which sub-layers with different reduced volumes of fine pores are incorporated as is shown in FIG. 1 that the maximum difference in reduced volume of fine pores of 1.0 μm or less in diameter, which is obtained by a mercury porosimetry and a conversion using the cylinder approximation, in a thickness direction of the electrode catalyst layer is in the range of 0.1-1.0 mL/g-(electrode catalyst layer). The unit mL/g-(electrode catalyst layer) herein means a reduced volume of fine pores (unit: mL) in 1 gram of the electrode catalyst layer. In the case where the difference is less than 0.1 mL/g-(electrode catalyst layer) or more than 1.0 mL/g-(electrode catalyst layer), it may be difficult either to retain drainage of water produced by the electrode reaction or to achieve water retention properties under a low humidified condition.

It is preferable in an MEA with an electrode catalyst layer having a two-sub-layer structure as is shown in FIG. 1 that a first electrode catalyst sub-layer having a larger reduced volume is thicker than a second electrode catalyst sub-layer having a smaller reduced volume. It is possible to achieve both drainage of water produced by the electrode reaction and water retention under a low humidified condition by employing the first electrode catalyst sub-layer having a larger reduced volume and larger layer thickness than a second electrode catalyst sub-layer.

The structure of an electrode catalyst layer of an MEA of the present invention is not limited to a two-sub-layer structure. An electrode catalyst layer of more than two sub-layers is also applicable. In such a case, reduced volumes of fine pores of 1.0 μm or less in diameter, which is obtained by a mercury porosimetry and a conversion using the cylinder approximation, are made to increase gradually (or stepwise) toward the inner boundary with the polymer electrolyte membrane.

Both a case in which only one of two electrode catalyst layers has a structure in which reduced volumes of fine pores of 1.0 μm or less in diameter (The reduced volume is obtained by a mercury porosimetry and a conversion using the cylinder approximation.) increases gradually (or stepwise) toward the inner boundary with the polymer electrolyte membrane and a case in which both two electrode catalyst layers have such structures are included in the MEA of the present invention. In the former case, it is preferable that the electrode catalyst layers have a structure in which reduced volumes of fine pores of 1.0 μm or less in diameter increases gradually (or stepwise) toward the inner boundary with the polymer electrolyte membrane is arranged on the air electrode (cathode). The latter case is more preferable, however, considering water retention in the polymer electrolyte membrane under a low humidified condition.

Next, a fuel cell of the present invention is described.

Figure 2:
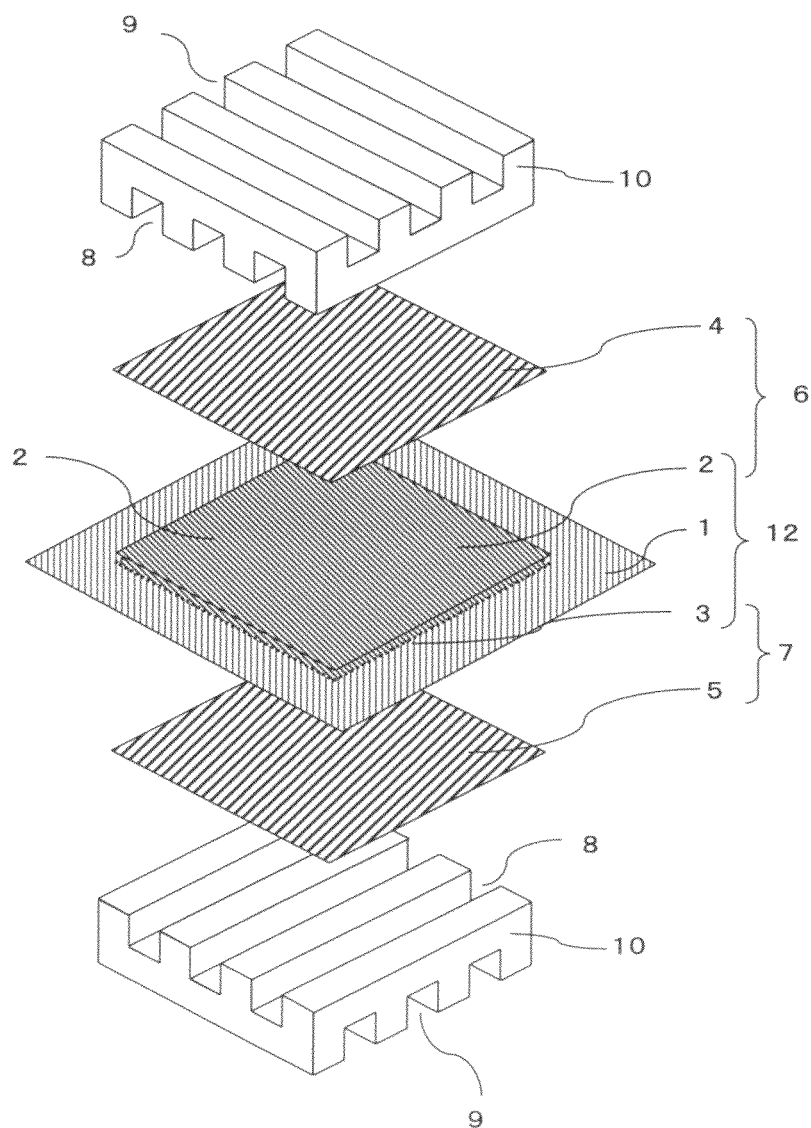
FIG. 2 is an exploded exemplary diagram of a fuel cell of the present invention.

FIG. 2 shows an exploded exemplary diagram of a fuel cell of the present invention. A gas diffusion layer on the cathode (air electrode) 6 and a gas diffusion layer on the anode (fuel electrode) 7 are arranged facing the electrode catalyst layers 2 and 3 of an MEA 12, respectively, thereby forming the cathode (air electrode) 6 and the anode (fuel electrode) 7. Then, a pair of separators 10, each of which are made of conductive and impermeable material and has a gas flow path 8 on one surface and cooling liquid path 9 on the other surface, are arranged on the MEA 12. A fuel gas such as hydrogen gas is supplied to the MEA 12 via the gas flow path 8 of the separator 10 on the fuel electrode 7. On the other hand, an oxidant gas such as a gas including oxygen is supplied to the MEA 12 via the gas flow path 8 of the separator 10 on the air electrode 6. Then, oxygen gas and hydrogen as the fuel gas are reacted together on the electrode under the presence of a catalyst so that an electromotive force is generated between the fuel electrode and the air electrode.

The fuel cell illustrated in FIG. 2 is a so-called single cell PEMFC having a polymer electrolyte 1, electrode catalyst layers 2 and 3, and gas diffusion layers 4 and 5 between a pair of separators. The present invention, however, also includes a fuel cell in which a plurality of single cells are stacked and combined together via the separators 10.

Next, a manufacturing method of an MEA of the present invention is described.

The method includes the following three processes, process A, process B and process C.

<Process A>

A manufacturing process in which catalyst loaded particles and a polymer electrolyte are dispersed in a solvent to prepare a catalyst ink (first catalyst ink) followed by coating the catalyst ink on a substrate and drying the catalyst ink coated on the substrate to form a first electrode catalyst sub-layer.

<Process B>

A manufacturing process in which catalyst loaded particles and a polymer electrolyte are dispersed in a solvent to prepare a catalyst ink (second catalyst ink) followed by coating the catalyst ink on a substrate and drying the catalyst ink coated on the substrate to form a second electrode catalyst sub-layer.

<Process C>

A manufacturing process in which the first and/or the second electrode catalyst sub-layer is formed on at least one of the two surfaces of a polymer electrolyte membrane. In the case where both the first and the second electrode catalyst sub-layers are formed, it is noted that the first electrode catalyst sub-layer is arranged between the polymer electrolyte membrane and the second electrode catalyst sub-layer.

It is a feature of the manufacturing method of an MEA of the present invention that a solvent removal rate in forming the first electrode catalyst sub-layer (in the process A) is higher than a solvent removal rate in forming the second electrode catalyst sub-layer (in the process B).

The inventor discovered that it was possible to form electrode catalyst sub-layers with different reduced volumes of fine pores by varying the solvent evaporation rate of the sub-layer when drying to form the first and/or second electrode catalyst sub-layers, and the present invention was completed. The electrode catalyst sub-layers are formed by coating a catalyst ink in which catalyst loaded particles and a polymer electrolyte are dispersed in a solvent and removing the solvent in the coated catalyst ink. At this time, the reduced volume of fine pores becomes large if the solvent removal rate of the coated catalyst ink is high. In contrast, the reduced volume of fine pores becomes small if the solvent removal rate of the coated catalyst ink is low.

Any of a transfer sheet, a gas diffusion layer, and a polymer electrolyte membrane can be used as the substrate in the manufacturing method of an MEA of the present invention. In addition, there is no limitation to the order of <process A>, <process B> and <process C>, and the order can be appropriately and flexibly selected in the present invention.

In the case where a transfer sheet or a gas diffusion layer is used as the substrate, after the second electrode catalyst sub-layer is formed on the substrate, the first electrode catalyst sub-layer is formed on the second electrode catalyst sub-layer. The substrate together with the second electrode catalyst sub-layer and the first electrode catalyst sub-layer, which are formed thereon in this order, is arranged facing a polymer electrolyte membrane (on the first electrode catalyst sub-layer). Then, the first and the second electrode catalyst sub-layers, which can be regarded together as a single electrode catalyst layer, are transferred to the polymer electrolyte membrane. Afterwards, the substrate is peeled off and removed if a transfer sheet is used as the substrate whereas the substrate does not have to be removed if a gas diffusion layer is used as the substrate. In this way an MEA which has the first electrode catalyst sub-layer and the second electrode catalyst sub-layer on at least one surface of the polymer electrolyte membrane in this order is manufactured. It is noted in this case that the processes A to C are performed in the order of <process B>, <process A> and <process C>.

In addition, in the case where a polymer electrolyte membrane is used as the substrate, the first electrode catalyst sub-layer is directly formed on the substrate using a first catalyst ink. Subsequently, the second electrode catalyst sub-layer is directly formed on the first electrode catalyst sub-layer on the substrate using a second catalyst ink. It is noted in this case that the <process A> and <process C> are performed together first, followed by the <process B> and <process C> together.

In addition, in the case where a transfer sheet is used as the substrate, the first electrode catalyst sub-layer is formed on the substrate and the substrate is arranged in such a way that the coated first electrode catalyst sub-layer faces a polymer electrolyte membrane. After the first electrode catalyst sub-layer is transferred to the polymer electrolyte membrane, the transfer sheet as the substrate is peeled off and removed. Then, the second electrode catalyst sub-layer is formed on a substrate of a transfer sheet or a gas diffusion layer and the substrate is arranged in such a way that the coated second electrode catalyst sub-layer faces the first electrode catalyst sub-layer on the polymer electrolyte membrane. After the second electrode catalyst sub-layer is transferred to the first electrode catalyst sub-layer on the polymer electrolyte membrane, the substrate is peeled off and removed if a transfer sheet is used as the substrate whereas the substrate does not have to be removed if a gas diffusion layer is used as the substrate. In this way an MEA which has the first electrode catalyst sub-layer and the second electrode catalyst sub-layer on at least one surface of the polymer electrolyte membrane in this order is manufactured. It is noted in this case that the processes A to C are performed in the order of <process A>, <process C>, <process B> and <process C>.

In addition, it is also possible to use a polymer electrolyte membrane as the substrate to form the first electrode catalyst sub-layer directly on the polymer electrolyte membrane, and to use a transfer sheet or a gas diffusion layer as the other substrate to form the second electrode catalyst sub-layer followed by transferring the second electrode catalyst sub-layer to the first electrode catalyst sub-layer on the polymer electrolyte membrane.

In addition, it is also possible to use a transfer sheet as the substrate to transfer and form the first electrode catalyst sub-layer on a polymer electrolyte membrane, and to use the polymer electrolyte membrane, on which the first electrode catalyst sub-layer is formed, as the other substrate to form the second electrode catalyst sub-layer directly on the first electrode catalyst sub-layer on the polymer electrolyte membrane.

In addition, it is also possible to use a transfer sheet as the substrate(s) to form the first electrode catalyst sub-layer and/or the second electrode catalyst sub-layer followed by transferring the first electrode catalyst sub-layer and/or the second electrode catalyst sub-layer to gas diffusion layer(s) and forming the transferred first electrode catalyst sub-layer and/or the second electrode catalyst sub-layer on a polymer electrolyte membrane.

It is noted that the manufacturing method of an MEA of the present invention is not limited to the methods described above. In addition, the manufacturing method of an MEA of the present invention may include other processes or factors besides those described above. For example, a hot press process can be used to form the first electrode catalyst sub-layer or the second electrode catalyst sub-layer on the polymer electrolyte membrane and combine them together.

In addition, the first and the second catalyst inks for forming the first and the second electrode catalyst sub-layers, respectively, may be the same ink although it is not necessary. Different inks may also be used as the first catalyst ink and the second catalyst ink.

Figure 3:
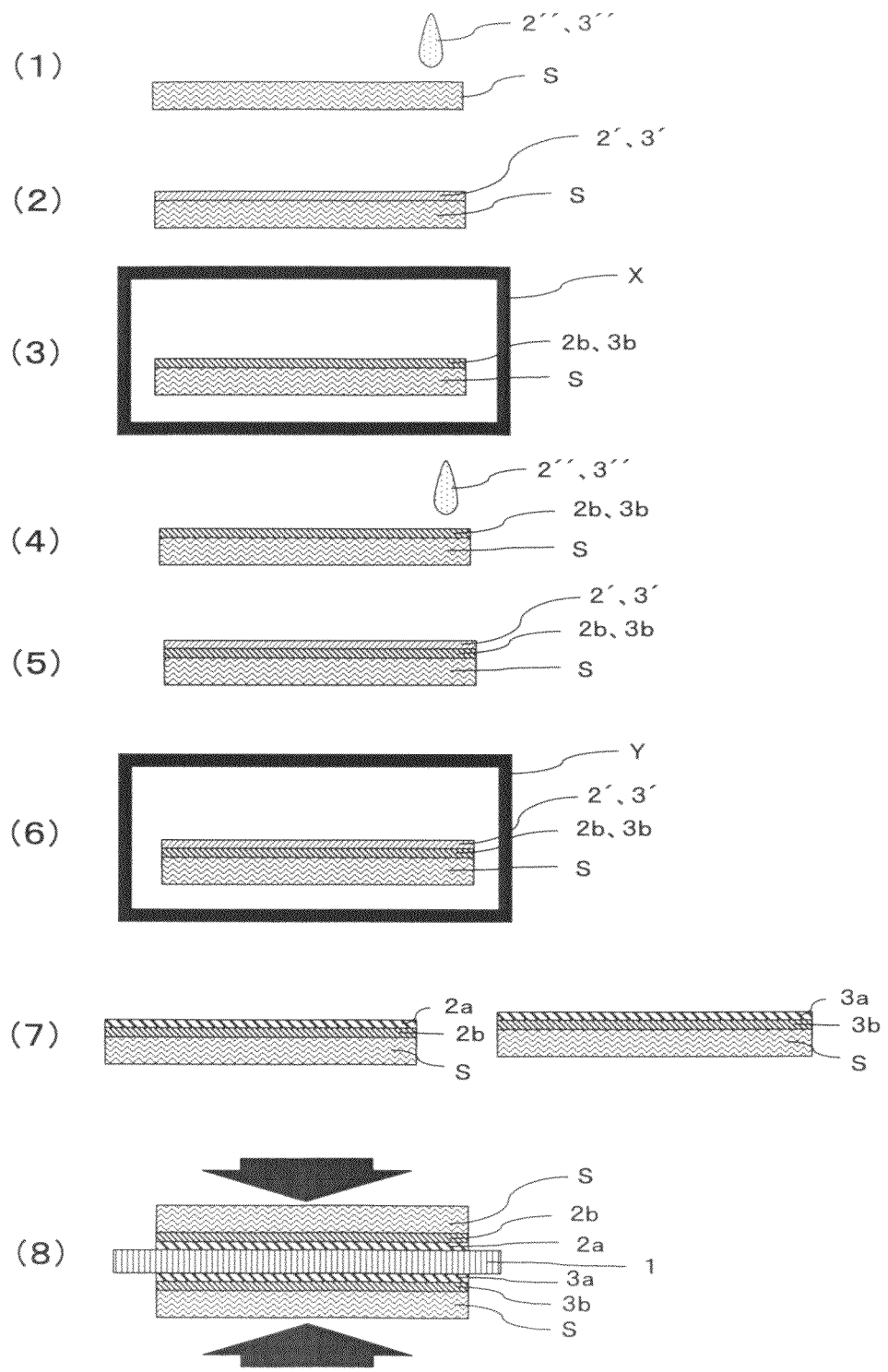
FIG. 3 is an explanatory diagram of an embodiment of a method for manufacturing an MEA of the present invention.

FIG. 3 illustrates an embodiment of the manufacturing method of an MEA of the present invention. In making an MEA of the present invention, catalyst inks 2" and 3", in which catalyst loaded particles and a polymer electrolyte are dispersed in a solvent, are coated either on a transfer sheet or on a gas diffusion layer as a substrate S (FIG. 3-(1)) to form coated layers 2' and 3' (FIG. 3-(2)). The coated layers 2' and 3' on the substrate S are dried in an oven X so that second electrode catalyst sub-layers 2b and 3b are formed (FIG. 3-(3)). It is a feature of the present invention that a solvent removal rate during this drying to form the second electrode catalyst sub-layers is lower than a solvent removal rate to form first electrode catalyst sub-layers, which is described later.

Subsequently, inks 2" and 3", in which a polymer electrolyte is dispersed in a solvent, are coated on the second electrode catalyst sub-layers on the substrate S (FIG. 3-(4)) to form coated layers 2' and 3' (FIG. 3-(5)). These coated layers on the second electrode catalyst sub-layers are dried in an oven Y so that first electrode catalyst sub-layers 2a and 3a are formed (FIG. 346)). It is a feature of the present invention that the solvent removal rate during this drying to form the first electrode catalyst sub-layers is higher than the solvent removal rate to form the second electrode catalyst sub-layers.

Next, using a resultant substrate on which a second electrode catalyst sub-layer 2b and a first second electrode catalyst sub-layer 2a are formed and another resultant substrate on which a second electrode catalyst sub-layer 3b and a first second electrode catalyst sub-layer 3a are formed (FIG. 3-(7)), the electrode catalyst sub-layers 2a, 2b, 3a and 3b are transferred to both surfaces of a polymer electrolyte membrane by hot press so that an MEA of the present invention is manufactured (FIG. 3-(8)). After the electrode catalyst sub-layers 2a, 2b, 3a and 3b are transferred to the surfaces of the polymer electrolyte membrane, the substrate S is peeled off and removed if a transfer sheet is used as the substrate S whereas the substrate S is not removed if a gas diffusion layer is used as the substrate S.

It is a feature of the manufacturing method of an MEA of the present invention that the solvent removal rate during drying to form the first electrode catalyst sub-layers is higher than that to form the second electrode catalyst sub-layers. At this time, the solvent removal rate can be controlled by a drying temperature. The solvent removal rate increases and a reduce volume of fine pores in the resultant electrode catalyst sub-layer becomes large if the drying temperature is high. The solvent removal rate decreases and a reduced volume of fine pores in the resultant electrode catalyst sub-layer becomes small if the drying temperature is low.

The solvent removal rate can be controlled not only by the drying temperature but also by wind quantity when hot air blowing is used for drying. For example, it is possible to change the solvent removal rate by strengthening hot air even when drying temperature is kept unchanged. In addition, it is also possible to control the solvent removal rate by both the drying temperature and the hot air quantity. Considering controllability, however, it is preferred to control the solvent removal rate during drying to form the first and the second electrode catalyst sub-layers by the drying temperature.

It is preferable that the drying temperatures when forming the first and the second electrode catalyst sub-layers are in the range of 0-150° C. Unevenness may be generated on the electrode catalyst sub-layers if the drying temperature exceeds 150° C. In addition, in the case where a polymer electrolyte is used as the substrate, proton conductivity of the polymer electrolyte may also decrease. On the other hand, it is preferable that the drying temperature is not less than 0° C. considering temperature controllability.

Since the solvents in the catalyst inks begin to evaporate as soon as the ink is coated on the substrate, it is preferred to keep the substrate on which the catalyst ink is coated immediately in an oven etc. after the coating.

In the case where the first electrode catalyst sub-layer is formed on the second electrode catalyst sub-layer by coating the second catalyst ink directly onto the first electrode catalyst sub-layer or vice versa, it is preferred to remove the solvent in the second (or first) electrode catalyst sub-layer (the preliminarily coated sub-layer) sufficiently. If the solvent is insufficiently removed, it becomes difficult to control the reduced volume of fine pores in the first and second electrode catalyst sub-layers because the second (or first) catalyst sub-layer (the preliminarily coated sub-layer) is heavily soaked with the first (or second) catalyst ink (the latest coated ink).

In the manufacturing method of an MEA illustrated in FIG. 3, the first electrode catalyst sub-layer, which has a large reduced volume of fine pores, is formed after the second electrode catalyst sub-layer, which has a small reduced volume of fine pores, is formed. It becomes possible to easily make a smaller reduced volume of fine pores in the second electrode catalyst sub-layer than the first electrode catalyst sub-layer by forming the sub-layers in such a sequence. The second electrode catalyst sub-layer may be soaked with the first catalyst ink to a certain degree when forming the first electrode catalyst sub-layer. It is sometime difficult to appropriately arrange the small reduced volume of fine pores of the second electrode catalyst sub-layer on the large reduced volume of fine pores of the first electrode catalyst sub-layer, since the first electrode catalyst sub-layer, which is required to have a large reduced volume of fine pores, is soaked with the second catalyst ink when forming the second electrode catalyst sub-layer.

An MEA of the present invention in which a reduce volume of fine pores equal to or less than 1.0 μm in diameter (The reduced volume is measured by a mercury porosimetry and converted by a cylinder approximation.) increases from a surface side to the center side (the polymer electrolyte membrane side) in at least one electrode catalyst layer can be manufactured in the method described above.

An MEA and a fuel cell of the present invention are further described in detail.

Since polymer electrolytes having proton conductivity can be used as the polymer electrolyte membrane of MEA and PEMFC of the present invention, a certain type of fluoropolymer electrolytes and hydrocarbon polymer electrolytes can be used. For example, Nafion (a registered trademark) made by DuPont, Flemion (a registered trademark) made by Asahi Glass Co., Ltd., Aciplex (a registered trademark) made by Asahi Kasei Corp., and Gore Select (a registered trademark) made by W. L. Gore & Associates, Inc. etc. are available as the fluoropolymer electrolytes. Electrolyte membranes of sulfonated polyetherketone (PEK), sulfonated polyethersulfone (PES), sulfonated poly(ether ether sulfone) (PEES), sulfonated polysulfide and sulfonated polyphenylene etc. are available as the hydrocarbon polymer electrolytes. Above all, Nafion (a registered trademark) series materials made by DuPont are preferable.

The electrode catalyst layers formed on both surfaces of the polymer electrolyte membrane of an MEA of the present invention are formed on both sides of the polymer electrolyte membrane using a catalyst ink. The catalyst ink contains at least a polymer electrolyte and catalyst loaded carbons.

Since proton conductive polymer electrolytes can be used as the polymer electrolyte contained in the catalyst ink, similar electrolytes to those suitable for the polymer electrolyte membrane can also be used in the catalyst ink. In other words, a certain type of fluoropolymer electrolytes and hydrocarbon polymer electrolytes can be used. For example, Nafion (a registered trademark) made by DuPont etc. are available as the fluoropolymer electrolytes. Electrolyte membranes of sulfonated polyetherketone (PEK), sulfonated polyethersulfone (PES), sulfonated poly(ether ether sulfone) (PEES), sulfonated polysulfide and sulfonated polyphenylene etc. are available as the hydrocarbon polymer electrolytes. Above all, Nafion (a registered trademark) series materials made by DuPont are preferable. Considering the adhesion between the electrode catalyst layer and the polymer electrolyte membrane, it is preferred to use the same material in the catalyst ink as that used as the polymer electrolyte membrane.

Metals of platinum group such as platinum, palladium, ruthenium, iridium, rhodium and osmium, and other metals such as iron, tin, copper, cobalt, nickel, manganese, vanadium, molybdenum, gallium and aluminum etc. as well as alloys, oxides and multiple oxides of these metals can be used as the catalyst of the present invention. In addition, the catalyst is preferred to have a particle size in the range of 0.5-20 nm in diameter because the catalyst activity weakens if the particle is too large whereas the stability decreases if the particle is too small. The particle size in the range of 1-5 nm is more preferable. Catalyst particles of any one or more of platinum, gold, palladium, rhodium, ruthenium and iridium are preferably used in the present invention since they have excellent electrode reactivity and promote efficient and stable electrode reactions so that the resultant PEMFC has a high level of power generation performance.

Carbon particles are temporarily used as conductive powder on which the catalyst particles are loaded. Any type of carbon can be used as long as it has a particle shape and electrical conductivity along with chemical resistance to the catalyst. For example, carbon black, graphite, active carbon, carbon fiber, carbon nanotube and fullerene can be used. It becomes difficult to form electron conduction paths if the carbon particle size is too small, whereas gas diffusion gets worse and catalyst efficiency decreases if the carbon particle size is too large. Thus, it is preferable that the carbon size is in the range of about 10-1000 nm in diameter. In the range of 10-100 nm is more preferable.

There is no particular limitation to the solvent used as a dispersant of the catalyst ink as long as the solvent never chemically reacts with the catalyst particles and the polymer electrolyte and is able to dissolve or disperse the polymer electrolyte as something such as a micro gel in a highly fluid state. It is, however, preferable in the solvent that at least one volatile organic solvent is contained although it is not necessary. Usually, alcohols such as methanol, ethanol, 1-propanol, 2-propanol, 1-butanol, 2-butanol, isobutyl alcohol, t-butyl alcohol and pentanol etc., ketone solvents such as acetone, methyl ethyl ketone, pentanone, methyl isobutyl ketone, heptanone, cyclohexanone, methyl cyclohexanone, acetonylacetone and diisobutyl ketone etc., ether solvents such as tetrahydrofuran, dioxane, diethylene glycol dimethyl ether, anisole, methoxytoluene and dibutyl ether etc., other polar solvents such as dimethylformamide, dimethylacetoamide, N-methylpyrrolidone, ethylene glycol, diethylene glycol, diacetone alcohol and 1-methoxy-2-propanol etc. are used. In addition, solvent mixtures of any combination of these can also be used.

In addition, a mixture with water is preferred to be used in the case where a lower alcohol is used as a solvent since lower alcohols involve a danger of ignition. Water may be included if the polymer electrolyte blends well together with water. There is no limitation to the amount of added water as long as the polymer electrolyte is not turned into a gel (gelated) nor separated from the solvent to become clouded.

Pore volume of the electrode catalyst layer (or sub layer) depends on or is influenced by factors such as composition of the catalyst ink, dispersion condition, amount of polymer electrolyte, type of dispersion solvent, dispersing method and dispersing treatment time etc. By controlling one or more of these factors, it is possible to form an electrode catalyst layer in such a way that pore volume thereof increases from the gas diffusion layer side toward the boundary with the polymer electrolyte membrane.

The catalyst inks may include a dispersant in order to disperse catalyst loaded carbon particles. An anion surfactant, a cation surfactant, a zwitterionic surfactant and a nonionic water soluble surfactant etc. are available as the dispersant.

Specifically, for example, carboxylate type surfactants such as alkyl ether carbonates, ether carbonates, alkanoyl sarcosines, alkanoyl glutaninates, acyl glutaninates, oleic acid N-methyltaurine, potassium oleate diethanolamine salts, alkyl ether sulfate triethanolamine salts, polyoxyethylene alkyl ether sulfate triethanolamine salts, amine salts of specialty modified polyether ester acids, amine salts of higher fatty acid derivatives, amine salts of specialty modified polyester acids, amine salts of large molecular weight polyether ester acids, amine salts of specialty modified phosphate esters, amideamine salts of large molecular weight polyether ester acids, amide-amine salts of specialty aliphatic acid derivatives, alkylamine salts of higher fatty acids, amide-amine salts of large molecular weight polycarboxylic acids, sodium laurate, and sodium stearate, sodium oleate etc., sulfonate type surfactants such as dialkylsulfosuccinates, salts of 1,2-bis(alkoxycarbonyl)-1-ethanesulfonic acid, alkylsulfonates, paraffin sulfonates, alpha-olefin sulfonates, linear alkylbenzene sulfonates, alkylbenzene sulfonates, polynaphthylmethane sulfonates, naphthalenesulfonate-formaline condensates, alkylnaphthalene sulfonates, alkanoylmethyl taurides, sodium salt of lauryl sulfate ester, sodium salt of cetyl sulfate ester, sodium salt of stearyl sulfate ester, sodium salt of oleyl sulfate ester, lauryl ether sulfate ester salt, sodium alkylbenzene sulfonates, and oil-soluble alkylbenzene sulfonates etc., sulfate ester type surfactants such as alkylsulfate ester salts, alkyl sulphates, alkyl ether sulphates, polyoxyethylene alkyl ether sulfates, alkyl polyethoxy sulfates, polyglycol ether sulfates, alkyl polyoxyethylene sulfates, sulfonate oil, and highly sulfonated oil etc., phosphate ester type surfactants such as monoalkyl phosphates, dialkyl phosphates, monoalkyl phosphate esters, dialkyl phosphate esters, alkyl polyoxyethylene phosphates, alkyl ether phosphates, alkyl polyethoxy phosphates, polyoxyethylene alkyl ethers, alkylphenyl polyoxyethylene phosphate, alkylphenyl ether phosphates, alkylphenyl polyethoxy phosphates, polyoxyethylene alkylphenylether phosphates, disodium salts of higher alcohol phosphate monoester, disodium salts of higher alcohol phosphate diester, and zinc dialkyl dithiophosphate etc. can be used as the anion surfactant mentioned above.

For example, benzyldimethyl [2-{2-(p-1,1,3,3-tetramethylbutylphenoxy)ethoxy}ethyl]ammonium chloride, octadecylamine acetate, tetradecylamine acetate, octadecyltrimethylammonium chloride, beef tallow trimethylammonium chloride, dodecyltrimethylammonium chloride, palm trimethylammonium chloride, hexadecyltrimethylammonium chloride, behenyltrimethylammonium chloride, palm dimethylbenzylammonium chloride, tetradecyldimethylbenzylammonium chloride, octadecyldimethylbenzylammonium chloride, dioleyldimethylammonium chloride, 1-hydroxyethyl-2-beeftallow imidazoline quaternary salt, 2-heptadecenyl-hydroxyethyl imidazoline, stearamideethyldiethylamine acetate, stearamideethyldiethylamine hydrochloride, triethanolamine monostearate formate, alkylpyridium salts, higher alkylamine-ethylene oxide adducts, polyacrylamide amine salts, modified polyacrylamide amine salts, and perfluoroalkyl quaternary ammonium iodide etc. can be used as the cation surfactant stated above.

For example, dimethyl cocobetaine, dimethyl lauryl betaine, sodium laurylaminoethyl glycine, sodium laurylaminopropionate, stearyl dimethyl betaine, lauryl dihydroxyethyl betaine, amide betaine, imidazolinium betaine, lecithin, sodium 3-(ω-fluoroalkanoyl-N-ethylamino)-1-propane sulfonate, and N-{3-(perfluorooctanesulfoneamide)propyl}-N, N-dimethyl-N-carboxymethylene ammonium betaine etc. can be used as the zwitterionic surfactant mentioned above.

For example, coconut fatty acid diethanolamide (1:2 type), coconut fatty acid diethanolamide (1:1 type), beef tallowate diethanolamide (1:2 type), beef tallowate diethanolamide (1:1 type), oleic acid diethanolamide (1:1 type), hydroxyethyl laurylamine, polyethylene glycol laurylamine, polyethylene glycol cocoamine, polyethylene glycol stearylamine, polyethylene glycol beef tallow amine, polyethylene glycol beef tallow propylenediamine, polyethylene glycol dioleylamine, dimethyllaurylamine oxide, dimethylstearylamine oxide, dihydroxyethyllaurylamine oxide, perfluoroalkylamine oxides, polyvinylpyrrolidone, higher alcohol-ethylene oxide adducts, alkyl phenol-ethylene oxide adducts, fatty acid-ethylene oxide adducts, propylene glycol-ethylene oxide adduct, fatty acid esters of glycerin, fatty acid esters of pentaerithritol, fatty acid esters of sorbitol, fatty acid esters of sorbitan, and fatty acid esters of sugar etc. can be used as the nonionic surfactant mentioned above.

Among these surfactants above, sulfonate type surfactants such as alkylbenzene sulfonic acids, α-olefin sulfonic acids, sodium alkylbenzene sulfonates, oil soluble alkylbenzene sulfonates, and α-olefin sulfonates are preferable considering the dispersion performance of the dispersing agent and the influences of a residual dispersing agent on the catalyst efficiency etc.

The catalyst ink receives dispersion treatment if necessary. It is possible to control the particles size and the catalyst ink viscosity by the dispersion treatment conditions. The dispersion treatment can be performed with various types of equipment. The dispersion treatment may include, for example, a treatment by a ball mill, a roll mill, a shear mill, or a wet mill and an ultrasonic dispersion treatment etc. In addition, it may also include a treatment by a homogenizer, in which stirring by a centrifugal force is performed.

The amount of the solid content in the catalyst ink is preferred to be in the range of 1-50% by weight. In the case where the amount of the solid content is too large, cracks tend to easily occur on the surface of the electrode catalyst layer since the viscosity of the catalyst ink becomes too high. On the other hand, in the case where the amount of the solid content is too small, the forming rate of the catalyst layer becomes too low to retain appropriate productivity. The solid content mainly includes two components, that is, the carbon particles (catalyst loaded carbon particles) and the polymer electrolyte. The larger the amount of catalyst loaded carbon particles included is, the higher the viscosity of the ink becomes even when the total amount of the solid content is unchanged. If the amount of carbon particles decreases, the viscosity also falls accordingly. Thus, it is preferable that the ratio of the catalyst loaded carbon particles to the total solid content is adjusted within the range of 10-80% by weight.

In addition, the catalyst ink may include a pore forming agent. Fine pores are created by removing this agent after the electrode catalyst is formed. Examples of the pore forming agent are materials soluble in acid, alkali or water, sublimation materials such as camphor, and materials which decompose by heat. If the pore former is soluble in warm water, it may be removed by water produced during the power generation.

Inorganic salts (soluble to acid) such as calcium carbonate, barium carbonate, magnesium carbonate, magnesium sulfate, and magnesium oxide etc., inorganic salts (soluble to alkali aqueous solution) such as alumina, silica gel, and silica sol etc., metals (soluble to acid and/or alkali) such as aluminum, zinc, tin, nickel, and iron etc., inorganic salts (soluble to water) aqueous solutions of sodium chloride, potassium chloride, ammonium chloride, sodium carbonate, sodium sulfate, and monobasic sodium phosphate etc., and water soluble organic compounds such as polyvinyl alcohol, and polyethylene glycol etc. are available as the pore forming agent soluble in acid, alkali or water. Not only a single material but a plurality of these together can effectively be used.

The catalyst inks are coated on the substrate and dried to form an electrode catalyst layer (or sub-layer). In the case where a gas diffusion layer or a transfer sheet is used as the substrate, the electrode catalyst layer (sub-layer) is transferred to and combined with both surfaces of the polymer electrolyte membrane. In addition, in an MEA of the present invention, it is also possible to use a polymer electrolyte membrane as the substrate, coat the catalyst ink directly on both surfaces of the polymer electrolyte membrane and form an electrode catalyst layer (sub-layer) directly on the polymer electrolyte membrane.

At this time, a doctor blade method, a dipping method, a screen printing method, a roll coating method and a spray method etc. can be used as the coating method. Among these, the spray method such as, for example, a pressure spray method, an ultrasonic spray method, and an electrostatic spray method etc. has an advantage that agglutination of the catalyst loaded carbons hardly occurs when drying the coated catalyst ink so that an electrode catalyst layer (sub-layer) has evenly distributed high density pores.

A gas diffusion layer, a transfer sheet or a polymer electrolyte membrane can also be used as the substrate in the manufacturing method of an MEA of the present invention.

The transfer sheet which is used as the substrate is principally made of a material having good transfer properties. For example, fluororesins such as ethylene tetrafluoroethylene copolymer (ETFE), tetrafluoroethylene hexafluoroethylene copolymer (FEP), tetrafluoroethylene perfluoroalkyl vinyl ether copolymer (PFA), and polytetrafluoroethylene (PTFE) etc. can be used. In addition, polymer sheets or polymer films such as polyimide, polyethylene terephthalate (PET), polyamide (nylon), polysulfone (PSF), polyethersulfone (PES), polyphenylene sulfide (PPS), polyether ether ketone (PEEK), polyetherimide (PEI), polyarylate (PAR), and polyethylene naphthalate (PEN) etc. can be used as the transfer sheet. In the case where such a transfer sheet is used as the substrate, it is possible to peel off and remove the transfer sheet after an electrode catalyst layer (sub-layer) is stuck to the polymer electrolyte membrane so as to make an MEA in which electrode catalyst layers are arranged on both sides of the polymer electrolyte membrane.

In addition, materials having gas diffusion properties and electric conductivity can be used as the gas diffusion layer. Specifically, a carbon cloth, a carbon paper and a porous carbon such as unwoven carbon fabric can be used as the gas diffusion layer. Such a gas diffusion layer can also be used as the substrate. In this case, the substrate which acts as the gas diffusion layer is not peeled off after an electrode catalyst layer is stuck to the polymer electrolyte membrane.

In addition, in the case where the gas diffusion layer is used as the substrate, a filling (or sealing) layer may preliminarily be formed on the gas diffusion layer before the catalyst ink is coated. The filling (or sealing) layer is formed to prevent the catalyst ink from seeping into the gas diffusion layer. If the filling layer is preliminarily formed, the catalyst ink is accumulated on the filling layer and a three-phase boundary is formed even when the amount of the catalyst ink is small. Such a filling layer can be formed, for example, by dispersing carbon particles in a fluororesin solution and sintering the solution at a temperature higher than the melting point of the fluororesin. Polytetrafluoroethylene (PTFE) etc. can be used as the fluororesin.

In addition, a carbon separator and a metal separator etc. can be used as the separator of the present invention. The separator may incorporate a gas diffusion layer. In the case where the separator or the electrode catalyst layer also performs the function of the gas diffusion layer, it is unnecessary to arrange any independent gas diffusion layers. A fuel cell can be fabricated by joining additional equipment such as gas supply equipment and cooling equipment etc. to an MEA having such components described above.

EXAMPLES

A specific example and comparative example of an MEA of the present invention will be described below. The present invention, however, is not limited by the examples below.

An example and comparative example are described.

Example

<Preparation of Catalyst Inks>

Platinum loaded carbon catalyst in which 50 wt % of platinum is included (product trade name: TEC10E50E, made by Tanaka Kikinzoku Kogyo K.K.) and 20 wt % of polymer electrolyte solution (Nafion (a registered trademark) by DuPont) were mixed in a solvent and a dispersing treatment was performed by a planetary ball mill (product name: Pulverisette7, made by FRITSCH GmbH) for 30 minutes to obtain catalyst inks.

Composition ratio of the raw material were
in terms of solid content, TEC10E50E:Nafion=2:1 by weight;
in terms of dispersion solvent, 1-propanol:2-propanol=1:1 by volume;
and the overall solid content was 10 wt %.

<Substrate>

A sheet of polytetrafluoroethylene (PTFE) was used as a transfer sheet.

<Formation of Electrode Catalyst Layer on the Substrate>

After the catalyst ink was coated on a PTFE sheet as the substrate by doctor blade, the coated substrate was dried in an oven X for 30 min. at 40° C. under atmosphere. Subsequently the substrate was dried further in an oven Y for 5 min. at 90° C. under atmosphere to form a second electrode catalyst sub-layer. Then, after the catalyst ink was coated again on the second electrode catalyst sub-layer on the substrate, the substrate was dried in an oven Y for 5 min. at 90° C. under atmosphere to form a form electrode catalyst sub-layer. An electrode catalyst layer with a two-sub-layer structure was obtained in this way.

The catalyst ink used for forming the second electrode catalyst sub-layer per unit area was four times as much as the ink used for forming the first electrode catalyst sub-layer. The thickness of the electrode catalyst layer was adjusted in such a way that about 0.3 mg/cm$^2$ of platinum was loaded in the electrode catalyst layer.

<Manufacturing MEA>

The substrate on which the first and the second electrode catalyst sub-layers are formed was stamped out in a 25 cm$^2$ square shape and arranged facing both surfaces of a polymer electrolyte membrane (Nafion (a registered trademark) made by DuPont). Then, a hot press was performed with a pressure of 6.0×10$^6$ Pa at 130° C. to obtain an MEA.

<Measurement of Reduced Volume of Fine Pores>

A first and a second electrode catalyst sub-layer were formed on a transfer sheet of PTFE under the same condition as in the <Manufacturing MEA> section above. A small amount of the resultant first electrode catalyst sub-layer and the second electrode catalyst sub-layer were scraped off by a cutter respectively, and reduced volumes of fine pores of the sub-layers were measured by mercury porosimetry using a mercury porosimeter (product trade name: Pascal 140/240, made by Thermo Quest Corporation.). As a result, the reduced volume of fine pores of 1.0 µm or less in diameter of the first electrode catalyst sub-layer, which was obtained by the mercury porosimetry and converted by cylinder approximation, was smaller than that of the second electrode catalyst sub-layer by a difference of 0.29 mL/g-(electrode catalyst sub-layer).

Comparative Example

<Preparation of Catalyst Inks>

Platinum loaded carbon catalyst in which 50 wt % of platinum is included (product trade name: TEC10E50E, made by Tanaka Kikinzoku Kogyo K.K.) and 20 wt % of polymer electrolyte solution (Nafion (a registered trademark) by DuPont) were mixed in a solvent and a dispersing treatment was performed by a planetary ball mill (product name: Pulverisette7, made by FRITSCH GmbH) for 30 minutes to obtain catalyst inks.

Composition ratio of the raw material were
in terms of solid content, TEC10E50E:Nafion=2:1 by weight;
in terms of dispersion solvent, 1-propanol:2-propanol=1:1 by volume;
and the overall solid content was 10 wt %.

<Substrate>

A sheet of polytetrafluoroethylene (PTFE) was used as a transfer sheet.

<Formation of Electrode Catalyst Layer on the Substrate>

After the catalyst ink was coated on a PTFE sheet as the substrate by doctor blade, the coated substrate was dried in an oven Y for 5 min. at 90° C. under atmosphere to form a second electrode catalyst sub-layer. Then, after the catalyst ink was coated again on the second electrode catalyst sub-layer on the substrate, the substrate was dried in an oven Y for 5 min. at 90° C. under atmosphere to form a form electrode catalyst sub-layer. An electrode catalyst layer with a two-sub-layer structure was obtained in this way.

The catalyst ink used for forming the second electrode catalyst sub-layer per unit area was four times as much as the ink used for forming the first electrode catalyst sub-layer. The thickness of the electrode catalyst layer was adjusted in such a way that about 0.3 mg/cm$^2$ of platinum was loaded in the electrode catalyst layer.

<Manufacturing MEA>

The substrate on which the first and the second electrode catalyst sub-layers are formed was stamped out in a 25 cm$^2$ square shape and arranged facing both surfaces of a polymer electrolyte membrane (Nafion (a registered trademark) made by DuPont). Then, a hot press was performed with a pressure of 6.0×10$^6$ Pa at 130° C. to obtain an MEA.

Evaluation

<Power Generation Properties>

Each of the MEAs of the example and comparative example was interposed between and pasted together with a pair of carbon cloths, and arranged in a power generation evaluation cell (made by NF Corporation). Then, a current-voltage relationship of the cell was measured at a cell temperature of 80° C. under the following conditions using a fuel cell measurement system (made by NF Corporation). Hydrogen as a fuel gas and air as an oxidant gas were used, and the gas flow was controlled in such a way that the gas consumption efficiency became constant. In addition, the back pressure was 100 kPa.

On a fully humidified condition: anode 100% RH, cathode 100% RH.

On a low humidified condition: anode 20% RH, cathode 20% RH.

<Measurement Result>

Figure 4:
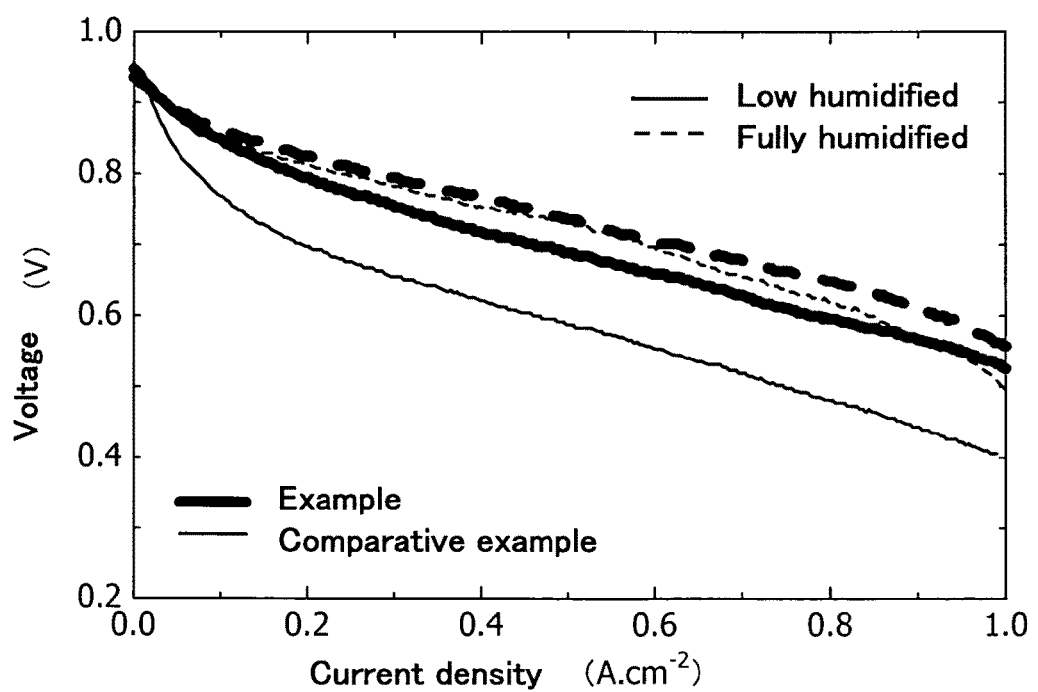
FIG. 4 shows power generation performances of MEAs manufactured in the Example and Comparative example.

FIG. 4 shows power generation properties of MEAs manufactured in the Example and Comparative example. The thick solid line in FIG. 4 is a power generation property of the MEA manufactured in the Example on the fully humidified condition, whereas the thin lines are those of the MEAs manufactured in the Comparative example and the dot lines are those of the MEA on the low humidified conditions.

From the results of the power generation properties of the Example and Comparative example, it is confirmed in an MEA in which the reduced volume of fine pores in the electrode catalyst layer increases from the gas diffusion layer side toward polymer electrolyte membrane side in the layer thickness direction (Example) that water retention properties of the electrode catalyst layer are improved so that the power generation properties on the low humidified condition are improved to a comparable level to those on the fully humidified condition. In contrast, in an MEA in which the reduced volume of fine pores in the electrode catalyst layer does not vary in the layer thickness direction (Comparative example), although the power generation properties on the fully humidified condition are comparable to those in the case of the Example, the power generation properties on the low humidified condition significantly inferior to those in the case of the Example.

From the results of the power generation properties of the Example and Comparative example, it is confirmed that the MEA in the Example on low humidified condition had power generation properties comparable to those on fully humidified condition. Hence, it seems that water retention properties were improved in the MEA in the Example without degrading drainage properties of water produced by the electrode reaction.

INDUSTRIAL APPLICABILTY

An MEA of the present invention has a pair of electrode catalyst layers, which includes a polymer electrolyte and catalyst loaded particles, and a polymer electrolyte interposed therebetween. It is a feature of the present invention that reduced volume of fine pores of 1.0 μm or less in diameter in the electrode catalyst layer, which is obtained by mercury porosimetry and conversion by cylinder approximation, increases from an outer surface side to an inner polymer electrolyte membrane side. The present invention improves water retention properties of the electrode catalyst layer without degrading diffusion of reaction gases and drainage of water produced by the electrode reaction by improving distribution of fine pores in the layer thickness direction in such a way that reduced volume of fine pores increases from the outer surface side to the inner polymer electrolyte membrane side. Moreover, the present invention does not cause a decrease in power generation performance due to an increase of interfacial resistance unlike conventional means to cope with low humidification condition such as an application of a humid control film or formation of chases on the electrode catalyst layer surface. Hence, a polymer electrolyte fuel cell with an MEA of the present invention has a significant advantage of a high level of power generation performance under a low humidification condition compared to fuel cells with a conventional MEA.

A method of manufacturing an MEA of the present invention is quite useful because it makes it possible to manufacture such an MEA easily, economically and efficiently.

What is claimed is:

1. A method of manufacturing an MEA having a polymer electrolyte membrane interposed between a pair of electrode catalyst layers, at least one of said electrode catalyst layers having a first electrode catalyst sub-layer and a second electrode catalyst sub-layer, said first electrode catalyst sub-layer having a larger volume of fine pores of 1.0 µm or less in diameter, which is obtained by mercury porosimetry and a conversion by cylinder approximation, than said second electrode catalyst sub-layer, said method comprising:

coating a second catalyst ink on a substrate and drying said second catalyst ink to form said second electrode catalyst sub-layer followed by coating a first catalyst ink on said substrate and drying said first catalyst ink to form said first electrode catalyst sub-layer; and forming said first electrode catalyst sub-layer and said second electrode catalyst sub-layer on at least one surface of said polymer electrolyte membrane in such a way that said first electrode catalyst sub-layer is arranged closer to said polymer electrolyte membrane than said second electrode catalyst sub-layer, said first catalyst ink being a dispersion solvent which contns catalyst loaded particles, a polymer electrolyte and a solvent, said second catalyst ink also being a dispersion solvent which contains catalyst loaded particles, a polymer electrolyte and a solvent, and a solvent removal rate when drying said first catalyst ink to form said first electrode catalyst sub-layer being higher than a solvent removal rate when drying said second catalyst ink to form said second electrode sub-layer.

2. A method of manufacturing an MEA having a polymer electrolyte membrane interposed between a pair of electrode catalyst layers, one of said electrode catalyst layers having at least three electrode catalyst sub-layers, said method comprising:

coating a catalyst ink on a substrate and drying said catalyst ink to form an electrode catalyst sub-layer of said at least three electrode catalyst sub-layers;

coating another catalyst ink on the electrode catalyst sub-layer formed on said substrate and drying said catalyst ink to form another electrode catalyst sub-layer of said at least three electrode catalyst sub-layers;

coating still another catalyst ink on said another electrode catalyst sub-layer formed on said electrode catalyst sub-layer and drying said still another catalyst ink to form still another electrode catalyst sub-layer of said at least three electrode catalyst sub-layers; and stacking said at least three electrode catalyst sub-layers on at least one surface of said polymer electrolyte membrane in an arrangement that said still another electrode catalyst sub-layer is closer to said polymer electrolyte membrane than said another electrode catalyst sub-layer and said another electrode catalyst sub-layer is closer to said polymer electrolyte membrane than said electrode catalyst sub-layer, wherein said catalyst ink is a dispersion solvent which contains catalyst loaded particles, a polymer electrolyte and a solvent, said another catalyst ink is also a dispersion solvent which contains catalyst loaded particles, a polymer electrolyte and a solvent, and said still another catalyst ink is also a dispersion solvent which contains catalyst loaded particles, a polymer electrolyte and a solvent, wherein a solvent removal rate when drying said still another catalyst ink to form said still another electrode catalyst sub-layer is higher than a solvent removal rate when drying said another catalyst ink to form said another electrode catalyst sub-layer, and a solvent removal rate when drying said another catalyst ink to form said another electrode catalyst sub-layer is higher than a solvent removal rate when drying said catalyst ink to form said electrode catalyst sub-layer, wherein all of said solvent removal rate when drying said catalyst ink, said solvent removal rate when drying said another catalyst ink and said solvent removal rate when drying said still another catalyst ink are controlled by drying temperature, and wherein said still another electrode catalyst sub-layer has a larger volume of fine pores of 1.0 µm or less in diameter, which is obtained by mercury porosimetry and a conversion by cylinder approximation, than said another electrode catalyst sub-layer, and wherein said another electrode catalyst sub-layer has a larger volume of fine pores of 1.0 µm or less in diameter. which is obtained by mercury porosimetry and a conversion by cylinder approximation, than said electrode catalyst sub-layer.

3. The method according to claim 2, wherein said volume of fine pores of 1.0 µm or less in diameter, which is obtained by mercury porosimetry and a conversion by cylinder approximation, of an electrode catalyst sub-layer which is arranged closest to said polymer electrolyte membrane of all of said electrode catalyst sub-layers is larger than that of an electrode catalyst sub-layer which is arranged furthest from said polymer electrolyte membrane of all of said electrode catalyst sub-layers by a difference in the range of 0.1-1.0 mL/g-(electrode catalyst sub-layer).

4. The method according to claim 1, wherein a drying temperature for drying said first catalyst ink to form said first electrode catalyst sub-layer is higher than a drying temperature for drying said second catalyst ink to form said second electrode catalyst sub-layer.

5. The method according to claim 4, wherein said drying temperature for drying said first catalyst ink to form said first electrode catalyst sub-layer is higher than said drying temperature for drying said second catalyst ink to form said second electrode catalyst sub-layer by a difference of 40° C. or more.

6. The method according to claim 1, wherein said volume of fine pores of 1.0 µm or less in diameter, which is obtained by mercury porosimetry and a conversion by cylinder approximation, of said first electrode catalyst sub-layer is larger than that of said second electrode catalyst sub-layer by a difference in the range of 0.1-1.0 mL/g-(electrode catalyst sub-layer).

7. The method according to claim 2, wherein said another electrode catalyst sub-layer has a thickness larger than said electrode catalyst sub-layer, and said still another electrode catalyst sub-layer has a thickness larger than said another electrode catalyst sub-layer.

8. The method according to claim 1. wherein said first electrode catalyst sub-layer has a thickness larger than said second electrode catalyst sub-layer.

* * * * *